United States Patent [19]

Suda

[11] Patent Number: 5,481,094
[45] Date of Patent: Jan. 2, 1996

[54] POINT-OF-SALE TERMINAL

[75] Inventor: Hiroshi Suda, Kawasaki, Japan

[73] Assignee: Fujitsu Limited, Kawasaki, Japan

[21] Appl. No.: 214,312

[22] Filed: Mar. 17, 1994

[30] Foreign Application Priority Data

May 28, 1993 [JP] Japan ................................. 5-126442

[51] Int. Cl.⁶ ................................................ G06F 17/60
[52] U.S. Cl. .......................................... 235/383; 364/405
[58] Field of Search ................................. 235/375, 383; 364/405

[56] References Cited

U.S. PATENT DOCUMENTS

| | | | |
|---|---|---|---|
| 4,671,512 | 6/1987 | Bachman et al. | 902/36 |
| 4,800,493 | 1/1989 | Takagi | 364/405 |
| 4,910,672 | 3/1990 | Off et al. | 235/487 |
| 5,008,519 | 4/1991 | Cunningham et al. | 235/383 |
| 5,128,520 | 7/1992 | Rando et al. | 235/375 |
| 5,192,854 | 3/1993 | Counts | 235/375 |
| 5,250,789 | 10/1993 | Johnsen | 235/385 |
| 5,278,396 | 1/1994 | McGaha | 235/383 |

FOREIGN PATENT DOCUMENTS

| | | |
|---|---|---|
| 0512509 | 11/1992 | European Pat. Off. . |
| 2163581 | 2/1986 | United Kingdom . |
| 2229028 | 9/1990 | United Kingdom . |
| 92/14213 | 8/1992 | WIPO . |

*Primary Examiner*—John Shepperd
*Attorney, Agent, or Firm*—Staas & Halsey

[57] ABSTRACT

An object of the present invention is to provide a POS terminal for making a package discount with respect to commodities previously purchased. The POS terminal for making a package discount intended to allow a discount through a combination of specified commodities, includes an input unit for inputting information concerning a commodity available for a package discount previously purchased; a determining unit for determining whether or not a package discount is provided by analyzing the information, which is entered at the input means, concerning a commodity eligible for the package discount and previously purchased, and information concerning a commodity eligible for the package discount currently purchased; and a discount unit which, when the package discount is provided, allows a discount from the price of the commodity currently being purchased.

8 Claims, 9 Drawing Sheets

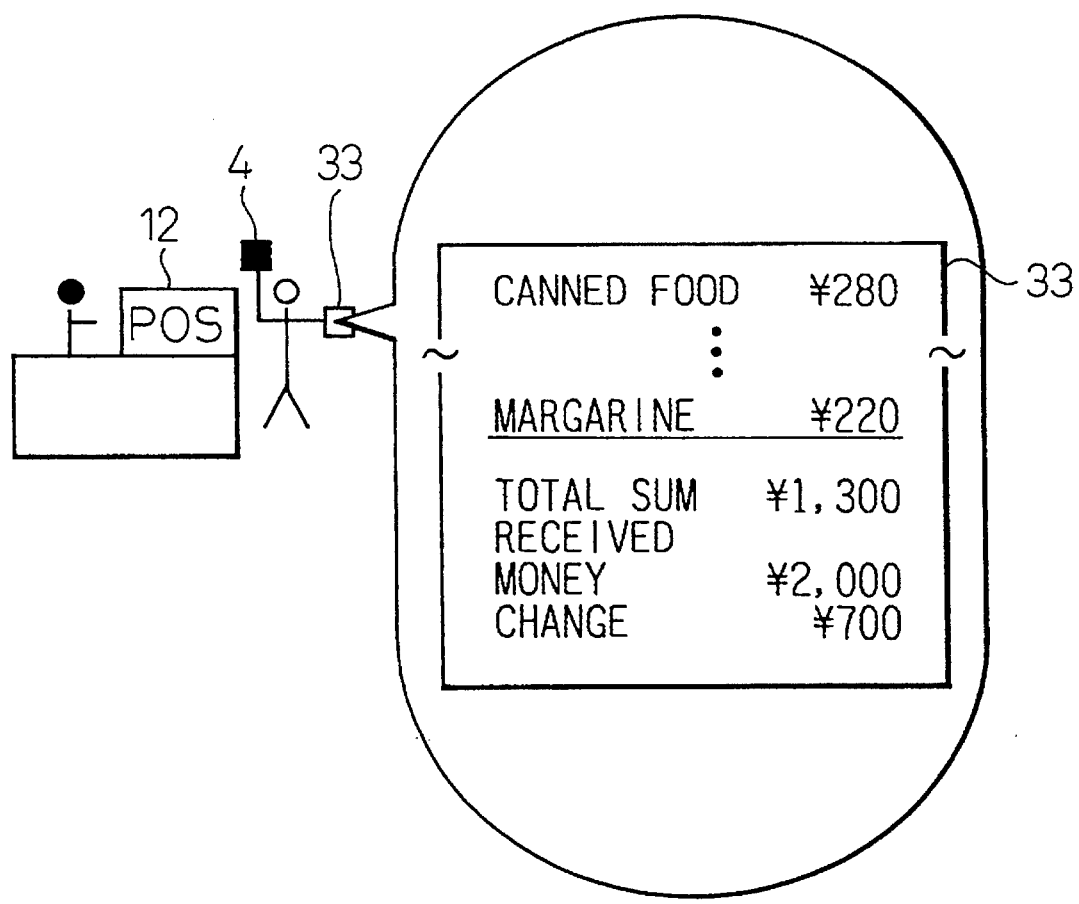

Fig.5

| | 51 | 52 | 53 | 54 | 55 | 56 | 57 | 58 |
|---|---|---|---|---|---|---|---|---|
| | COMMODITY CODE | COMMODITY NAME | UNIT PRICE | DEPARTMENT | ATTRIBUTE | COMBINED PRICE | QUANTITY | EFFECTIVE PERIOD |
| 1 | 49003508 | COOKIE | ¥350 | CONFECTIONERY | BM | ¥1,000 | 3 | 1992.05.01~ 1992.05.31 |
| 2 | 49023505 | CANDY | ¥350 | CONFECTIONERY | BM | ¥1,000 | 3 | 1992.05.01~ 1992.05.31 |
| 3 | 49013507 | CHOCOLATE | ¥350 | CONFECTIONERY | BM | ¥1,000 | 3 | 1992.05.01~ 1992.05.31 |
| 4 | 49063502 | CHEWING GUM | ¥350 | CONFECTIONERY | BM | ¥1,000 | 3 | 1992.05.01~ 1992.05.31 |
| 5 | 49113505 | BREAD | ¥180 | PROVISION | PM1 | ¥400 | 2 | 1992.03.01~ 1992.04.31 |
| 6 | 49203507 | MARGARINE | ¥240 | PROVISION | PM1 | ¥400 | 2 | 1992.03.01~ 1992.04.31 |
| 7 | 49313500 | SHAMPOO | ¥800 | DAILY NECESSARIES | PM2 | ¥1,500 | 2 | 1992.04.01~ 1992.10.31 |
| 8 | 49323501 | RINSE | ¥850 | DAILY NECESSARIES | PM2 | ¥1,500 | 2 | 1992.04.01~ 1992.10.31 |

POINT-OF-SALE TERMINAL

BACKGROUND OF THE INVENTION

1. Field of the Invention

The present invention relates to a point-of-sale (hereinafter, POS) terminal widely used in supermarkets, convenience stores, and various kinds of retail outlets. More particularly, this invention is concerned with a POS terminal for enabling a package discount to be provided for a commodity for which the package discount is available but which was not previously provided, and a commodity for which the package discount is available and which is currently being purchased.

In recent years, a package discount has been utilized as an effective discounting means for increasing the number of customers at shopping centers and supermarkets.

According to the present invention, for the package discount, when goods purchased by a shopper include a commodity eligible for the package discount but which is not currently being purchased as a package, a coupon is issued by recording information concerning the commodity, for example, in the form of bar codes on the lower part of a receipt. If a package discount is provided for commodities recorded in the coupon and a commodity subsequently purchased, a given discount is allowed.

2. Description of the Related Art

In recent years, efforts have been made to establish superiority over competitors in the marketing industry. As one sales strategy, there is a trend toward providing special services for increasing customer satisfaction. A package discount has been adopted as one sales method for providing these services.

To begin with, mention will be made of a package discount as directly related to the present invention.

One type of package discount, which is referred to as a bundle mix (BM) in this specification, one in which, for example, when packages of cookies, candies, chocolate, and chewing gum are each priced at 380 yen, if any three of these are purchased at the same time, the total price of 1140 yen is reduced to 1000 yen.

Another type of the package discount, which is referred to as a pair match (PM) in this specification, is one in which, for example, when the unit price of a bottle of shampoo is 500 yen and the unit price of a bottle of hair rinse is 450 yen, if a bottle of shampoo and a bottle of hair rinse that are eligible for pair match are purchased together, the total price of 950 yen is reduced to 800 yen.

To take advantage of a package discount given by supermarkets or the like, a shopper has had to buy all the goods required to comprise a package of specified commodities at the same time. Shoppers, therefore, tend to feel that they are paying too much money for these goods when buying them at unit prices. Therefore, retail sales stores suffer from lost sales.

SUMMARY OF THE INVENTION

An object of the present invention is to provide a POS terminal for resolving the aforesaid drawback of a conventional package discount.

Accordingly, the present invention provides a POS terminal comprising: an input unit for inputting information concerning a commodity eligible for a package discount that was purchased previously; a determining unit for determining whether or not the package discount is provided by analyzing the information which is entered at the input unit and concerning a commodity eligible for the package discount that was purchased previously, and information concerning a commodity eligible for the package discount that is currently being purchased; and a discounting unit which, when the package discount is provided, allows a discount from the price of the commodity currently being purchased. The POS terminal further comprises a bar-code reading unit. The information concerning a commodity eligible for the package discount that was purchased previously can be entered in the form of bar codes.

In another aspect of the present invention, when a package discount is not provided, a printing unit issues a coupon produced by printing information concerning a commodity for which the package discount is available but which was not provided. The coupon can be produced as a part of a receipt bearing purchase information. The information concerning a commodity for which the package discount is available but which was not provided, and which is to be printed to produce the coupon, can be printed in the form of bar codes.

In yet another aspect of the present invention, a coupon is produced by printing information concerning a commodity for which the package discount is available but which was not provided. The coupon can be produced as a part of a receipt. The commodity information can be printed in the form of bar codes.

The present invention is concerned with sales based on a package discount as currently adopted at supermarkets or the like, wherein when a package discount is not provided at the time of purchase, a coupon with an expiration date is issued. The coupon enables a package discount to be provided for commodities subsequently purchased and recorded on the coupon, whereby a discount is allowed for the commodities involved.

To be more specific, when purchasing and paying for commodities, a shopper hands a coupon with a record of commodities previously purchased, to an operator. The operator operates a scanner to read bar codes from the coupon. A determining unit then checks whether or not a package discount is provided for commodities purchased previously and those currently being purchased.

When the package discount is provided, a discounting unit allows a discount for the commodity involved. A display unit displays the discount.

When commodities currently being purchased include a commodity for which the package discount is available but which was not provided, a printing unit issues a coupon recording the commodity so that the package discount can be subsequently provided.

Thus, a complex package discount transaction can be effected retroactively, effortlessly and quickly. Shoppers feel they are paying less money for commodities, which promotes sales.

BRIEF DESCRIPTION OF THE DRAWINGS

FIGS. 4A and 4B show a package discount transaction according to the present invention;

FIG. 5 shows an example of a package discount control table according to the present invention;

DESCRIPTION OF THE PREFERRED EMBODIMENTS

Figure 1:
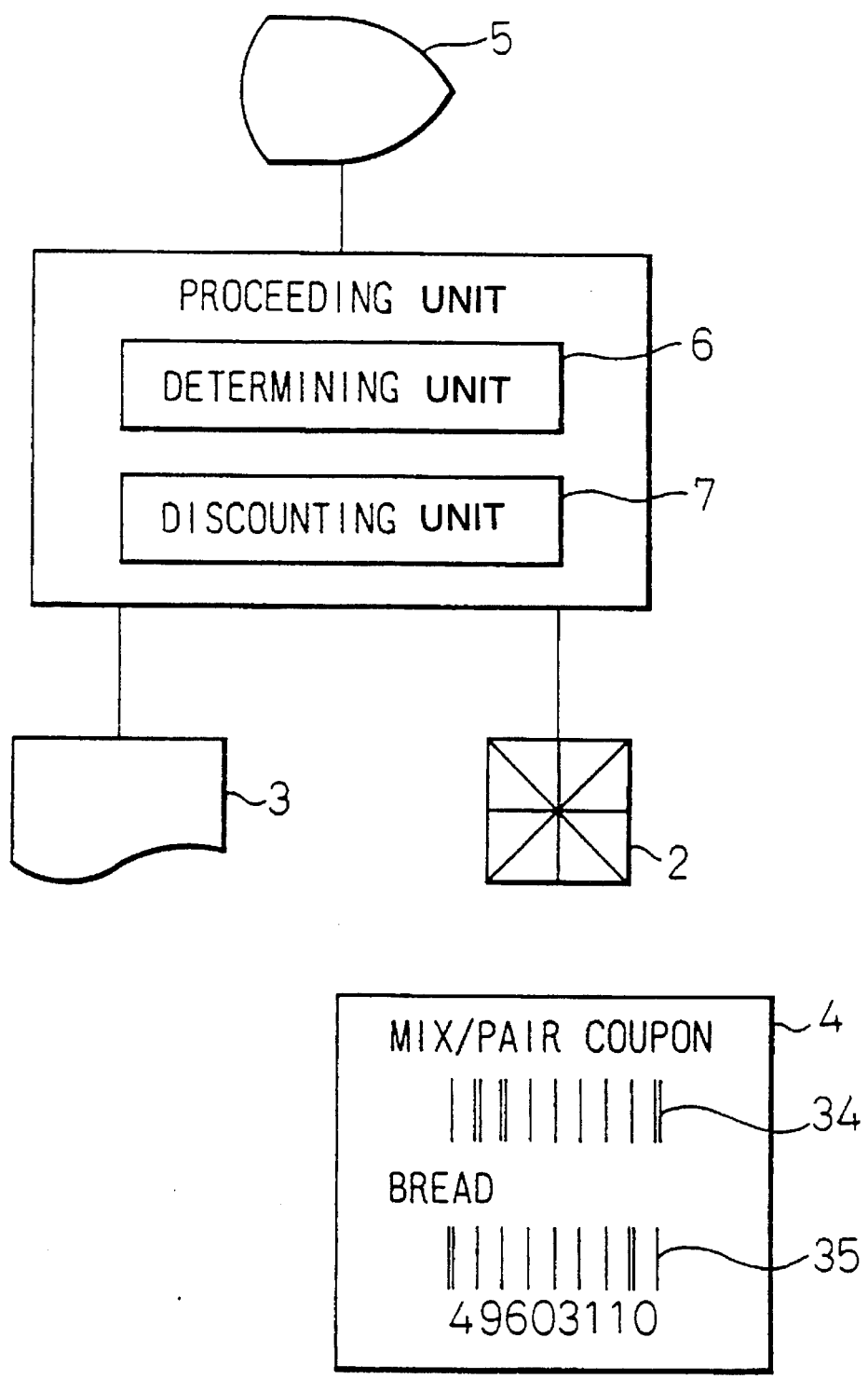
FIG. 1 is an explanatory diagrm showing a principle of a POS terminal according to the present invention.

Prior to explaining the embodiments of the present invention, the principle of a POS terminal according to the present invention will be described with reference to FIG. 1.

The present invention provides a POS terminal comprising an input unit 2 for inputting information concerning a commodity eligible for a package discount purchased previously; a determining unit 6 for determining whether or not a package discount is provided by analyzing the information which is entered at the input unit 2 and concerning a commodity eligible for the package discount purchased previously, and information concerning a commodity eligible for the package discount and being purchased currently; and a discounting unit 7 which when the package discount is provided, allows a discount from the price of the commodity currently being purchased. The POS terminal further comprises a bar-code reading means. The information concerning a commodity eligible for the package discount previously purchased can be entered in the form of bar codes.

In another aspect of the present invention, when a package discount is not provided, a printing unit 3 issues a coupon 4 produced by printing information concerning a commodity for which the package discount is available but which was not provided. The coupon 4 can be produced as a part of a receipt bearing purchase information. The information concerning a commodity for which the package discount is available but which was not provided, which is to be printed to produce the coupon, can be printed in the form of bar codes.

In yet another aspect of the present invention, a coupon 4 is produced by printing information concerning a commodity for which the package discount is available but which was not provided. The coupon 4 can be produced as a part of a receipt. The commodity information can be printed in the form of bar codes.

The present invention is concerned with sales based on a package discount as currently adopted at supermarkets or the like, wherein when a package discount is not provided at the time of purchase, a coupon 4 with an expiration date is issued. The coupon 4 enables a package discount to be provided for commodities subsequently purchased and recorded on the coupon, whereby a discount is allowed on the goods involved.

To be more specific, when purchasing and paying for goods, a shopper hands a coupon 4 with a record of commodities purchased previously, to an operator. The operator operates a scanner to read bar codes from the coupon 4. A determining unit 6 then checks whether or not a package discount is available for the commodities purchased previously and those currently being purchased.

When the package discount is provided, a discounting unit 7 allows a discount on the commodities involved. A display unit 5 displays the discount.

When commodities currently being purchased include a commodity for which the package discount is available but which was not provided, a printing unit 3 issues a coupon 4 recording the commodity so that the package discount can be provided subsequently.

Thus, the complex package discount transaction can be effected retroactively, effortlessly and quickly. Shoppers feel they are paying less money for goods, which promotes sales.

The coupon 4 used for the package discount transaction is collected by the operator and thus prevented from being refused.

An embodiment of the present invention will now be described with reference to the drawings. Components identical to or equivalent to these shown in FIG. 1 will be assigned the same reference numerals.

Figure 2:
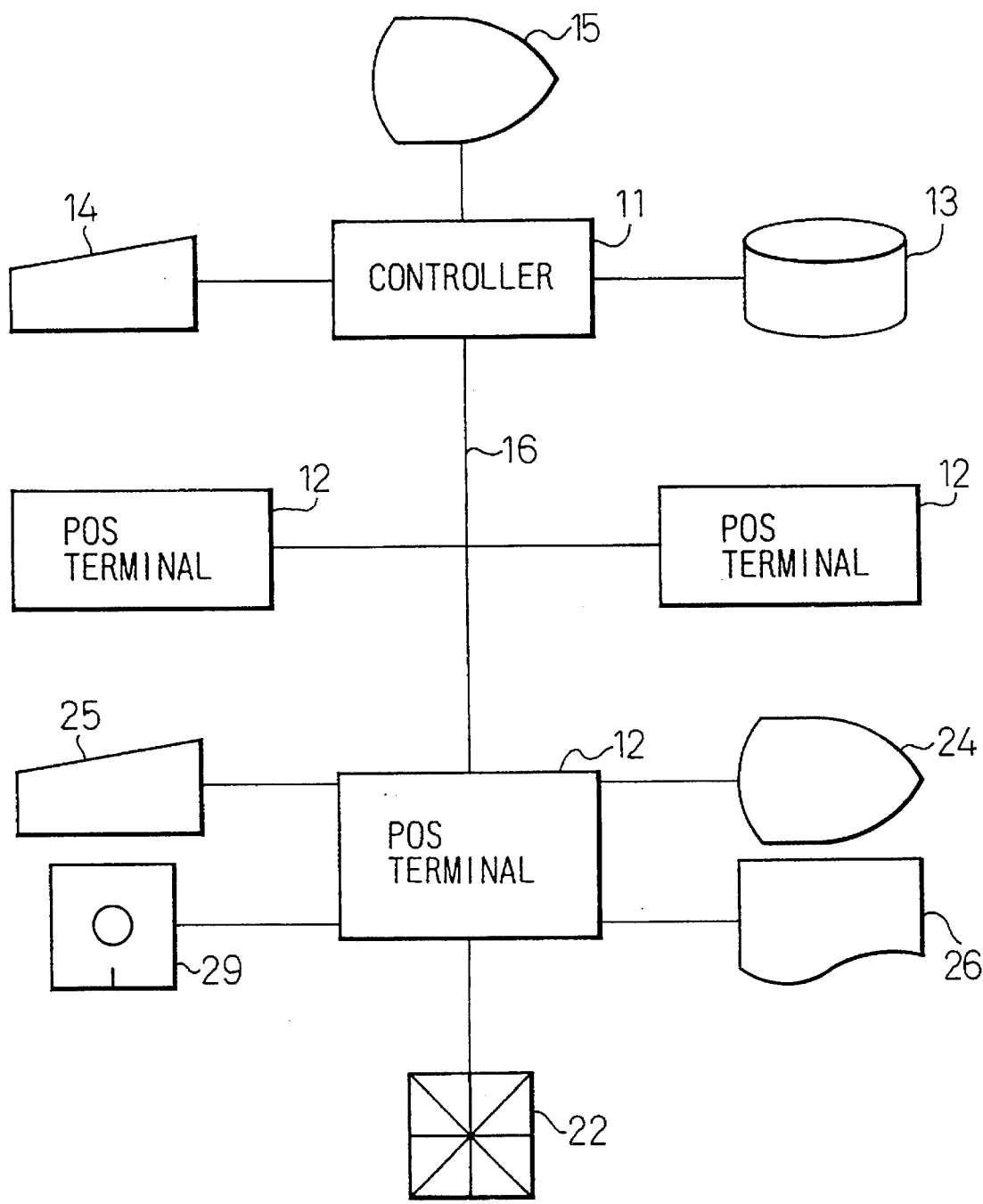
FIG. 2 shows an overall configuration of a POS terminal system according to the present invention.

FIG. 2 shows an overall configuration of a POS terminal system. As illustrated, each controller 11, which is provided in the POS terminal system and installed at individual stores, is connected to a plurality of POS terminals 12 or low-order units. Each controller 11 controls and manages an entire store, relays data transfer between indivudal POS terminals 12, and executes processing such as collation of terminals.

The controller 11 is accompanied by a hard disk 13 for storing various kinds of data concerning commodities, a keyboard 14, and a display 15. The hard disk 13 stores application programs for operating the controller and various kinds of data such as quantities of inventory.

The operation of the POS terminals 12 is controlled by the controller 11 via a communication control unit serving as a means for controlling a transmission line 16. Data is transferred from the POS terminals 12 to the controller 11 via the communication control unit over the transmission line 16.

Figure 3:
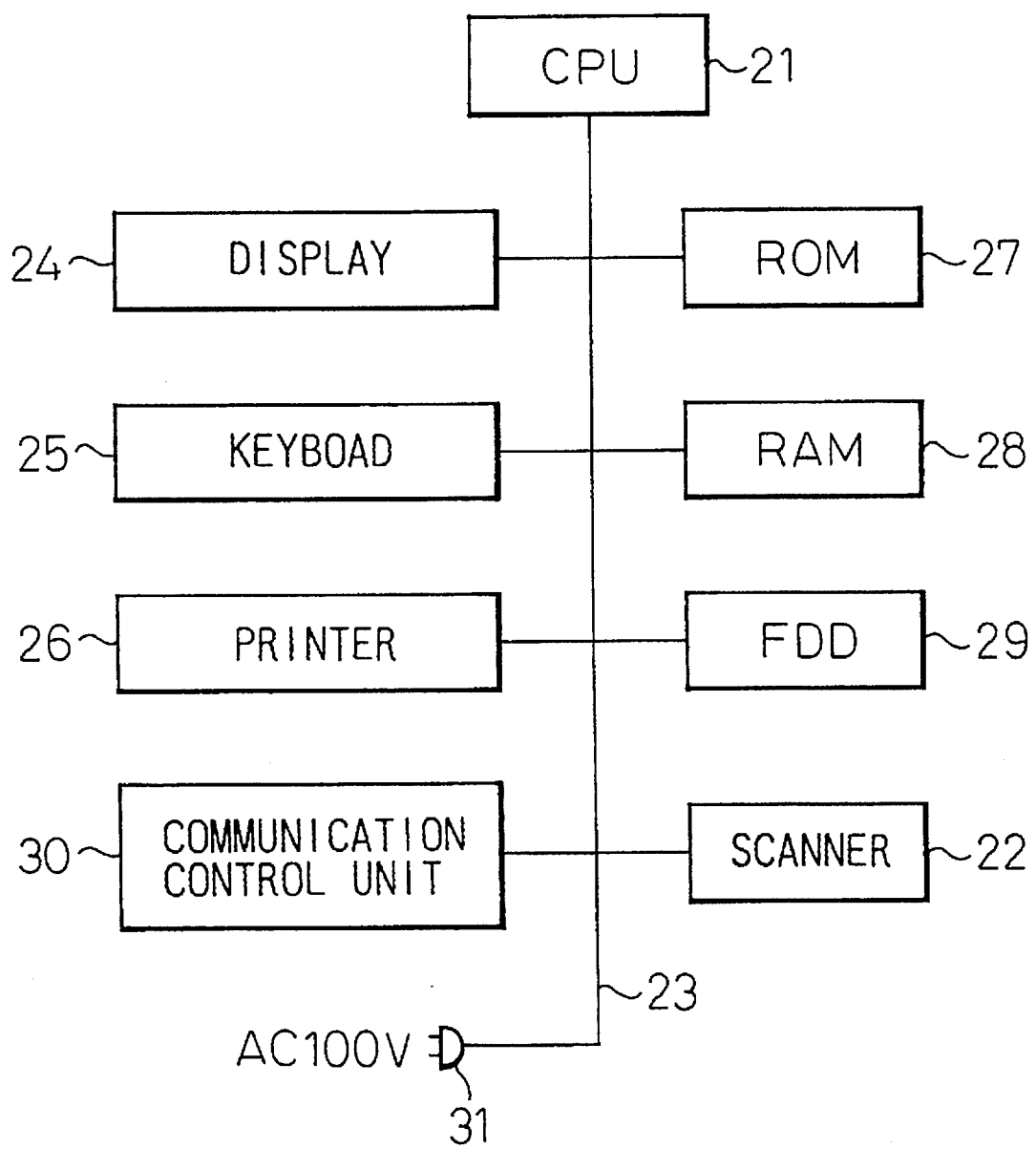
FIG. 3 is a block diagram showing a POS terminal according to the present invention.

FIG. 3 shows an overall configuration of a POS terminal serving as a terminal according to the present invention.

A CPU 21 handles bar-code date read by a scanner 22, and is responsible for control of the whole POS terminal 12.

A display 24, a keyboard 25, a printer 28, a ROM 27, a RAM 28, a floppy disk drive (FDD) 29, the scanner 22, and a communication control unit 30 for transferring information to or from an upper-order unit are connected over a bus 23 for the CPU 21.

The display 24 displays information sent from the CPU 21 over the system bus. The information to be displayed includes various kinds of data necessary for operating the POS terminal 12; such as, commodity names, quantities, prices, and a total price. The display 24 may be a liquid crystal display, a plasma display, or any other display.

The keyboard 25 is used to input given data necessary for operating the POS terminal 12 and to supply various commands to the POS terminal 12. An operator operates the keyboard 25 and scanner 22 to enter the data and commands.

The printer 26 is used to produce receipts. The printer 26 is used to produce not only a receipt bearing a breakdown of an ordinary transaction but also a coupon 4 for use in a package discount according to the present invention.

The ROM 27 contains operation programs required for operating the POS terminal 12.

The RAM 28 stores control programs required for operating the CPU 21 as well as data entered using an external device, data to be output externally, and other various data required for processing. The CPU 21 operates according to the programs stored in the RAM 28, thus controlling all of the POS terminal 12.

A package discount control table and a work area are stored in the RAM 28.

A floppy disk is mounted in the floppy disk drive 29. A program is read from the floppy disk and loaded in the RAM 28.

In the floppy disk drive 28, results of a transaction made by operating the POS terminal 12 are stored as sales data. Various data programs used by the POS terminal 12 are also stored on the disk.

The scanner 22 is of a known type for reading bar codes from bar-code labels affixed to goods purchased by shoppers, or from coupons.

The communication control unit 30 controls communication between the POS terminal 12 and controller 11. For example, the communication control unit 30 transmits data recorded in the POS terminal 12 to the controller 11 over the transmission line 16.

Reference numeral 31 denotes a power supply that is of a known type for supplying power to the whole POS terminal 12.

Reference numeral 4 denotes a coupon (See FIG. 1). The coupon 4 is provided as, for example, the lower part of a receipt, and contains a bar code 35 specifying the name of a commodity (a loaf of bread in FIG. 1) purchased by a shopper, for which the package discount is available but which was not provided, a quantity, and a date.

A bar code 34 indicating the package discount may be recorded on the upper side of the coupon 4. In this case, a program for making a package discount transaction is initiated by reading the bar code 34 using the scanner 22. This configuration enables automatic processing of the POS terminal.

Figure 4A:
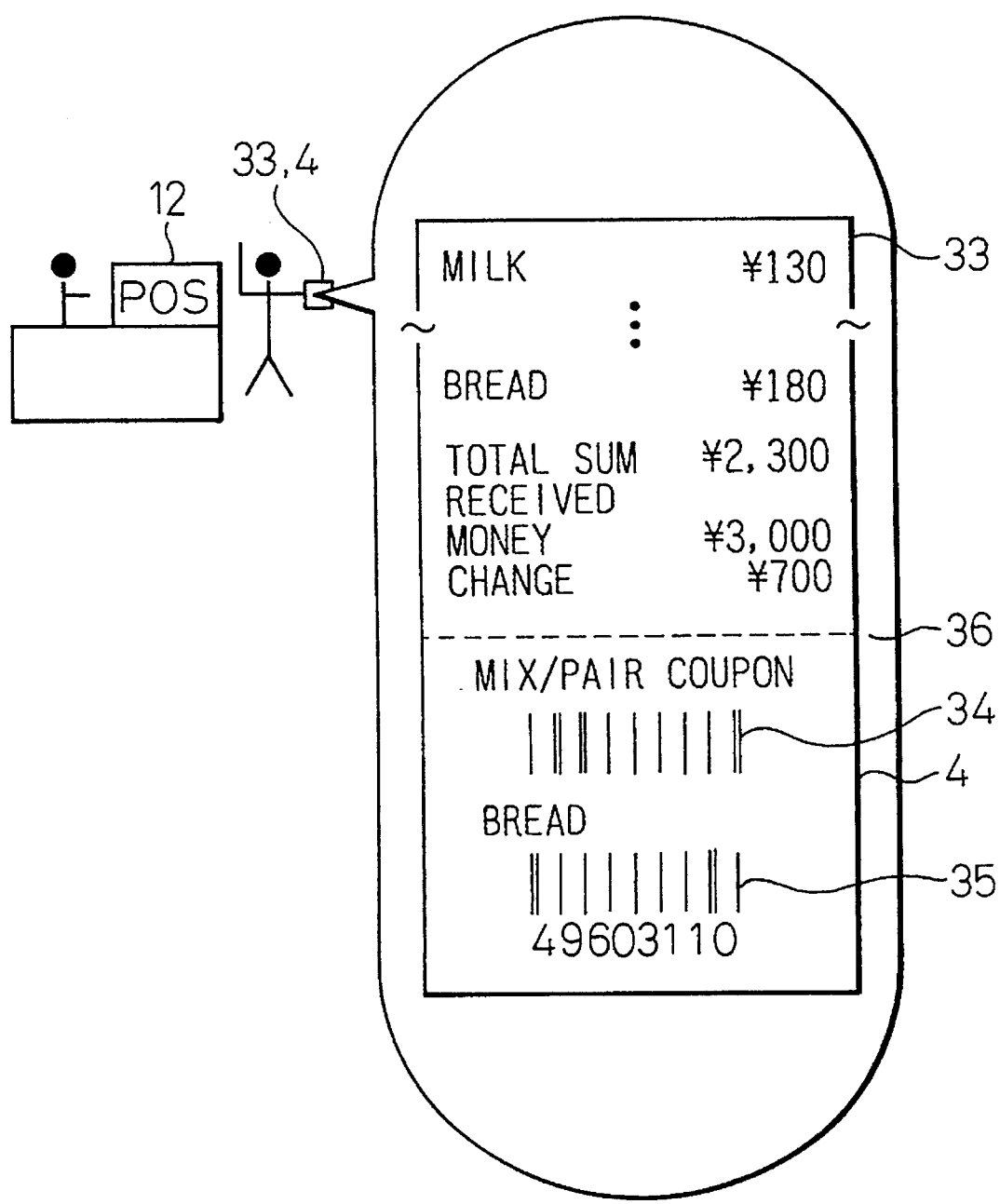

FIGS. 4A and 4B are explanatory diagrams showing examples of using a package discount coupon issued by a POS terminal according to the present invention.

FIG. 4A shows initial shopping. Assuming that a loaf of bread and a container of margarine are commodities eligible for a pair match of the package discount, if a shopper purchases a loaf of bread but not a container of margarine during initial shopping, the package discount is not provided.

The price of the loaf of bread is therefore paid at a normal price in this example, 180 yen. A coupon 4 recorded on the lower part of a receipt 23 is handed to the shopper, wherein a (package discount coupon) bar code 34 indicating a commodity for which the package discount is available and which was not provided, and a bar code 35 indicating the commodity is a loaf of bread, are recorded. A perforation 36 is formed to help separate the receipt 33 from the coupon 4.

FIG. 4B shows subsequent shopping. During the subsequent shopping, the shopper purchases a container of margarine. When paying, the shopper hands the package discount coupon 4, on which the bar code 35 representing a loaf of bread purchased previously is printed, to the operator. The operator scans the package discount coupon identification bar code 34 to initiate a package discount program.

Next, the operator scans the bar code 35 representing a loaf of bread, using the scanner. A package discount is then provided and a discount is allowed. Specifically, the normal price for a loaf of bread, i.e., 180 yen, is substracted from a package discount price which in this example is 400 yen. The price of the container of margarine then becomes 220 yen and the price of 220 yen is printed on the receipt 33.

FIG. 5 shows an example of a package discount control table employed for a package discount according to the present invention. In FIG. 5, 51 denotes a commodity code. A bar code is read from a bar-code lable affixed to a commodity or from the coupon 4 by means of the scanner 22. By reading the bar code, a commodity code is identified to specify the commodity.

Reference numeral 53 denotes a unit price which is adopted when an associated commodity is handled as is.

An attribute 55 indicates whether an associated commodity is eligible for the package discount. BM denotes a commodity eligible for a bundle mix (a bundle of packages of cookies, candies, chocolate, and chewing gum (BM)), while PM denotes a commodity eligible for a pair match (a pair comprises of a loaf of bread and a container of margarine (PM1) and a pair comprised of a bottle of shampoo and a bottle of rinse (PM2)). Thus, the attribute 55 is retrieved to specify a commodity eligible for a package discount.

A combined price 56 indicates a combined price for use when a package discount is provided. Instead of the combined price, a discount price may be recorded. A quantity 57 indicates the number of commodities to be combined for providing a package discount. The quantity required for pair match is 2. The quantity required for bundle mix may be any integral numerical value more than 2.

An effective period 58 indicates a period during which a package discount can still be rendered for an associated commodity. For determining whether or not the package discount can be provided, the effective period is checked to see if a coupon 4 is valid.

Figure 6:
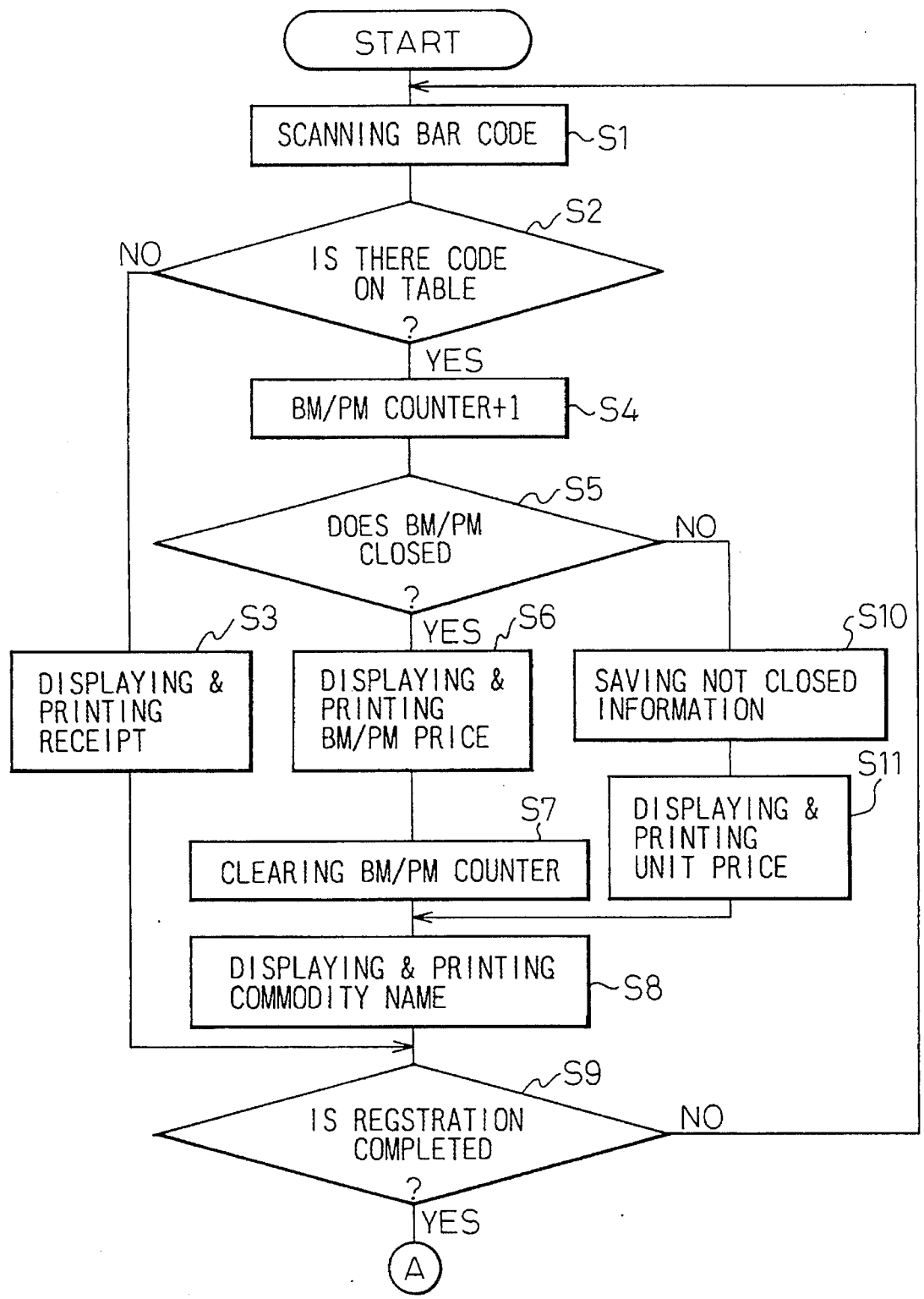
FIG. 6 is a flowchart showing the first half of a package discount coupon issuance according to the present invention.
Figure 7:
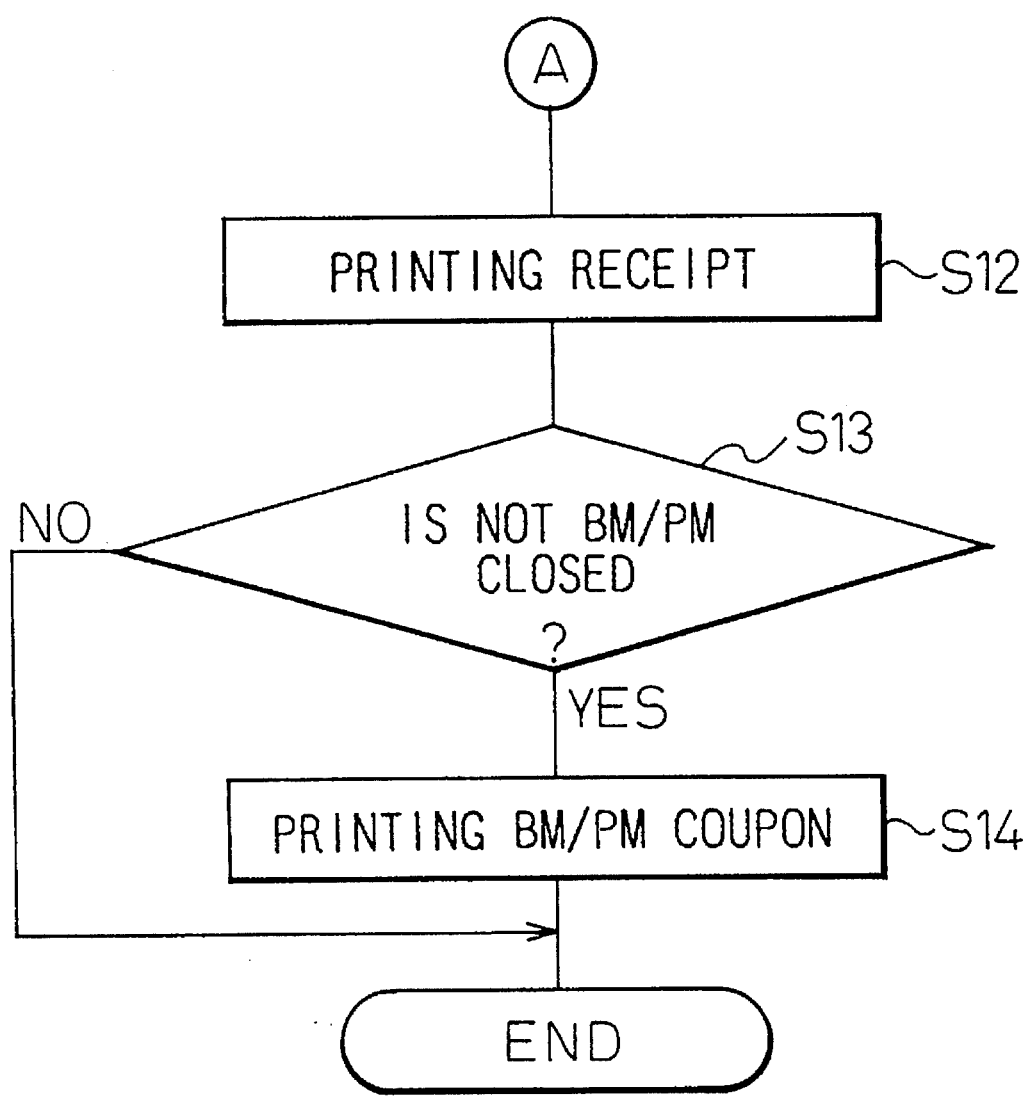
FIG. 7 is a flowchart showing the second half of the package discount coupon issuance according to the present invention.

Referring to the flowcharts of FIGS. 6 and 7 showing the package discount coupon issuance, the process of coupon issuance will be described.

When the POS terminal 12 is placed in a standby state, if a shopper completing shopping brings commodities to an operator, the transaction starts.

When a transaction begins, first, registration is performed for any of the commodities purchased (step S1). For registration of purchased commodities, the operator operates the scanner 22 to read bar codes from the purchased commodities brought by the shopper.

At this time, a bar code on any of the commodities read by the scanner 22 is used for paying, and collated with a commodity code in a package discount control table (See FIG. 5) existent in the RAM in order to look up an attribute of the commodity. It is then checked whether or not the commodity is eligible for the package discount (step S2).

As a result of searching the package discount control table, if it is determined that the commodity is not a commodity eligible for the package discount, a normal price look-up table is referred to to retrieve the commodity name of the commodity and the normal price for the commodity. The read data are then stored in a buffer, displayed on the display 5, and then printed to produce a receipt (step S3).

Next, it is determined whether or not the registration is completed for all the commodities purchased by the shopper (step S9). If the registration is not completed, control is returned to step S1. Registration is then completed for any of the purchased commodities remaining.

If a commodity of which bar code is read at step S2 is a commodity eligible for the package discount, a value of one of the counters installed in the RAM 28 is increased by one depending on whether the commodity is eligible for the package discount (step S4). Therefore, the counters are installed in groups for the package discount.

Next, it is determined weather or not the package discount is provided (step S5). Specifically, a counter value having been read from a coupon 4 and stored in the RAM 28 is referred to to see whether the package discount can be provided.

If the package discount is provided, the package discount control table shown in FIG. 5 is referred to to retrieve a combined price 56. The combined price 56 is used to calculate a package discount price. The normal price of the commodity is renewed to the calculated package discount price which is displayed on the display 24 and printed on the receipt (step S6).

For example, when a shopper purchases a pack of chewing gum (350 yen) that is a commodity eligible for the package discount, or is sold for 1000 yen per three items, if a pack of cookies priced at 350 yen and a pack of candies priced at 350 yen have already been printed on a receipt, 300 yen resulting from 1000-350-350 is printed as the price for the pack of chewing gum.

Next, the counter for commodities allowed for discount is cleared to zeroes (step S7). The name of the commodity eligible for the package discount is displayed on the display 24 and printed on the receipt (step S8). The process is then advanced to step S9 at which it is determined whether or not registration is completed for all purchased commodities.

When a commodity purchased by the shopper is a commodity eligible for the package discount, if it is found at step S5, that the package discount has not been provided, the code of the commodity and the information indicating that the package discount has not been provided are saved in the RAM 14 (step S10).

The package discount control table shown in FIG. 5 is then referred to to read out a unit price associated with the commodity code. The commodity name, unit price, and quantity are displayed and printed (step S11).

Next, the name of the commodity which was not provided the package discount is displayed on the display 24 and printed on the receipt (step S8).

It is then determined whether or not registration is completed for all the commodities purchased by the shopper (step S9). If registration is not completed, the process returns to step S1. Registration is returned to for any other remaining commodities being purchased.

If it is found at step S9 that registration is completed for all the commodities purchased by the shopper, the transaction is completed. A total sum, a commodity tax, an amount of money received, an amount of change, and a breakdown of the purchase are printed on the receipt 33 (step S12).

It is then determined whether or not the purchased commodities include a commodity for which the package discount is available but which was not currently provided, and the number of such commodities (step S13).

In other words, each counter for commodities eligible for the package discount existent in the RAM 14 is checked. If none of the purchased commodities are eligible for the package discount, the coupon 4 is unnecessary. The receipt 33 is then produced in a normal format and ejected. The transaction then terminates.

If the purchased commodities include a commodity eligible for the package discount, the coupon 4 is issued. Specifically, as seen from an enlarged area in FIG. 4A, a code and quantity of the commodity are printed in the form of bar codes 34 and 35 in the lower part of the receipt 33. The receipt 33 is then ejected. The transaction then terminates (step S14).

In this embodiment, the bar codes 34 and 35 are used to print information concerning a commodity not provided the package discount. The printing form for use in issuing the coupon 4 is not limited to bar codes but may be any other form representing commodity codes.

The coupon 4 may bear the package discount coupon bar code 34 (FIG. 4A) indicating that a commodity eligible for the package discount is recorded. In this case, once the POS terminal 12 reads the package discount coupon bar code 34 by the scanner 22, the POS terminal 12 becomes aware that the package discount should be made with respect to commodities previously purchased. The POS terminal 12 therefore automatically makes the package discount transaction with respect to the commodities previously purchased.

Figure 8:
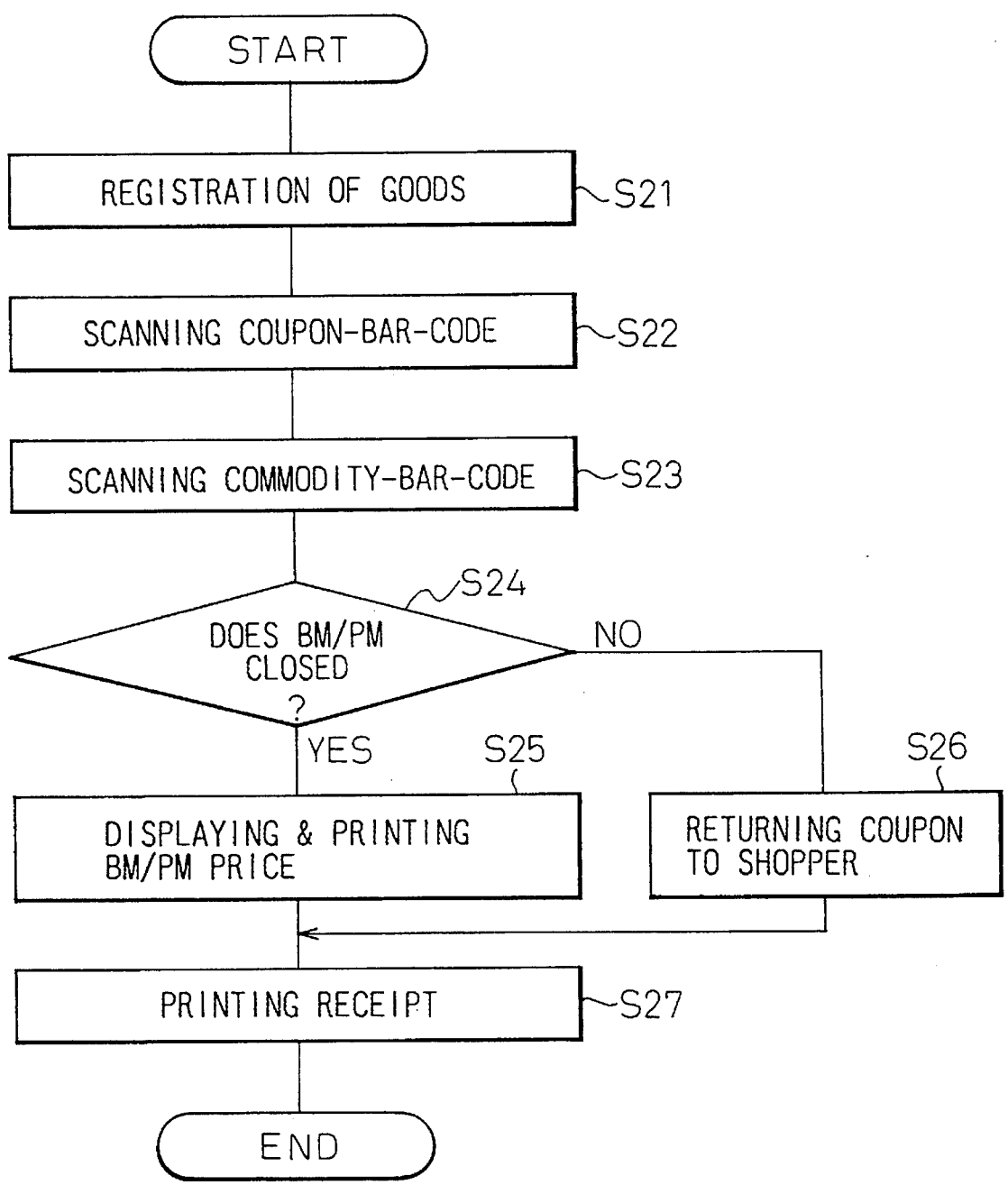
FIG. 8 is a flowchart showing an operational procedure for using a package discount coupon according to the present invention.

Referring to the flowchart of FIG. 8 showing an operational procedure for using the package discount coupon, a description will be given of the operational procedure to be performed for making the package discount transaction with respect to commodities previously purchased by a shopper.

First, registration is performed for all commodities a shopper is currently purchasing (step S21). The registration is effected by executing the process of steps S1 to S11 in FIG. 6.

When registration of the purchased commodities terminates, the operator receives the coupon 4 from the shopper, and operates the scanner 22 to read the package discount coupon bar code 34 from the receipt 33 shown in FIG. 4A (step S22). This operation initiates the program for making the package discount transaction with respect to commodities previously purchased.

Next, the bar code 35 representing a commodity involved is read from the coupon 4 (step S23).

It is then checked whether or not the package discount is provided for commodities read from the coupon 4 and currently being purchased (step S24). To be more specific, the package discount control table is searched for a commodity code read from the coupon 4 to retrieve an attribute, an effective period, and a quantity which are associated with the commodity code.

When the package discount is not provided, the coupon 4 is returned to the shopper (step S26). A normal payment transaction is carried out. A total commodity tax, an amount of money received, and an amount of change are displayed and printed on a receipt. The receipt is handed to the shopper (step S26). The transaction then terminates. At step S26, the process following steps S12 to S14 in FIG. 7 is executed.

If the package discount is provided at step S24, an altered price 56 is retrieved from the package discount control table shown in FIG. 5. The combined price 56 is used to calculated the package discount price. The normal price of the commodity currently being purchased is updated to the calculated price which is then displayed on the display and printed on the receipt (step S25).

Next, the transaction is carried out. A total commodity tax, an amount of money received, and an amount of change are displayed and printed on the receipt. The receipt is handed to the shopper (step S27). The transaction then terminates.

As described above, even if a package discount is not provided when an item is purchased, a shopper can receive the package discount at a subsequent shopping time. Shoppers therefore feel that they are paying less money for goods. This of course assists in promoting sales.

To check the contents of a coupon 4, bar codes are read. Operators therefore do not need to carry out complex package discount transactions, so work is simplified.

Using the aforesaid procedure, a common coupon usable at a plurality of stores may be issued so that a shopper can receive a similar service at any affiliated store. Shoppers will find this very convenient.

As detailed above, according to the present invention, a package discount coupon with an expiration date is recorded as part of a receipt and issued. As long as the expiration date has not passed, the package discount can be provided for any commodity previously eligible for package discount. Shoppers therefore feel they are paying less money for goods. This leads to an increase in the number of customers and provides an advantage over competitors.

I claim:

1. A POS terminal for making a package discount intended to allow a discount for a combination of specified commodities, comprising:

input means for inputting information concerning a commodity eligible for the package discount and purchased previously;

determining means for determining whether a package discount is provided by analyzing information, which is entered at the input means, concerning a commodity eligible for the package discount and purchased previously, and information concerning a commodity eligible for the package discount and currently being purchased; and discount means for allowing a discount from the price of the commodity currently being purchased when the package discount is provided.

2. A POS terminal according to claim 1, further comprising bar-code reading means, wherein the information concerning the commodity eligible for the package discount previously purchased is entered in the form of bar codes.

3. A POS terminal for making a package discount intended to allow a discount for a combination of specified commodities, comprising:

input means for inputting information concerning a commodity eligible for a package discount and purchased previously;

determining means for determining whether or not the package discount is provided by analyzing information, which is entered at the input means, concerning a commodity eligible for the package discount and purchased previously, and information concerning a commodity eligible for the package discount currently being purchased;

discount means for allowing a discount from the price of the commodity currently being purchased when the package discount is provided; and printing means for issuing a coupon produced by printing information concerning a commodity for which the package discount is available but which was not provided.

4. A POS terminal according to claim 3, wherein the coupon is produced as a part of a receipt bearing the purchase information.

5. A POS terminal according to claim 3, wherein the information, which is printed to produce the coupon, concerning a commodity for which the package discount is available but which was not provided, is printed in the form of bar codes.

6. A method for operating a POS terminal for providing a package discount to a product when part of the package was previously purchased, said method comprising the steps of:

inputting information concerning the commodity eligible for the package discount and purchased previously;

determining whether the package discount is provided by analyzing information, which is entered during the inputting step, concerning the commodity eligible for the package discount and purchased previously, and information concerning a commodity eligible for the package discount currently being purchased; and allowing a discount from the price of the commodity currently being purchased.

7. The method according to claim 6, wherein the inputting step reads a coupon produced as a part of a receipt.

8. The method according to claim 6, wherein the information concerning the commodity was printed in a form of a bar code on a coupon.

\* \* \* \* \*

UNITED STATES PATENT AND TRADEMARK OFFICE
CERTIFICATE OF CORRECTION

PATENT NO. : 5,481,094
DATED : January 2, 1996
INVENTOR(S) : Hiroshi SUDA

It is certified that error appears in the above-indentified patent and that said Letters Patent is hereby corrected as shown below:

Column 1, line 63, delete ":".

Column 2, line 57, change "diagrm" to --diagram--.

Signed and Sealed this

Fourteenth Day of May, 1996

Attest:

BRUCE LEHMAN

*Attesting Officer*         *Commissioner of Patents and Trademarks*